Patented Jan. 24, 1933

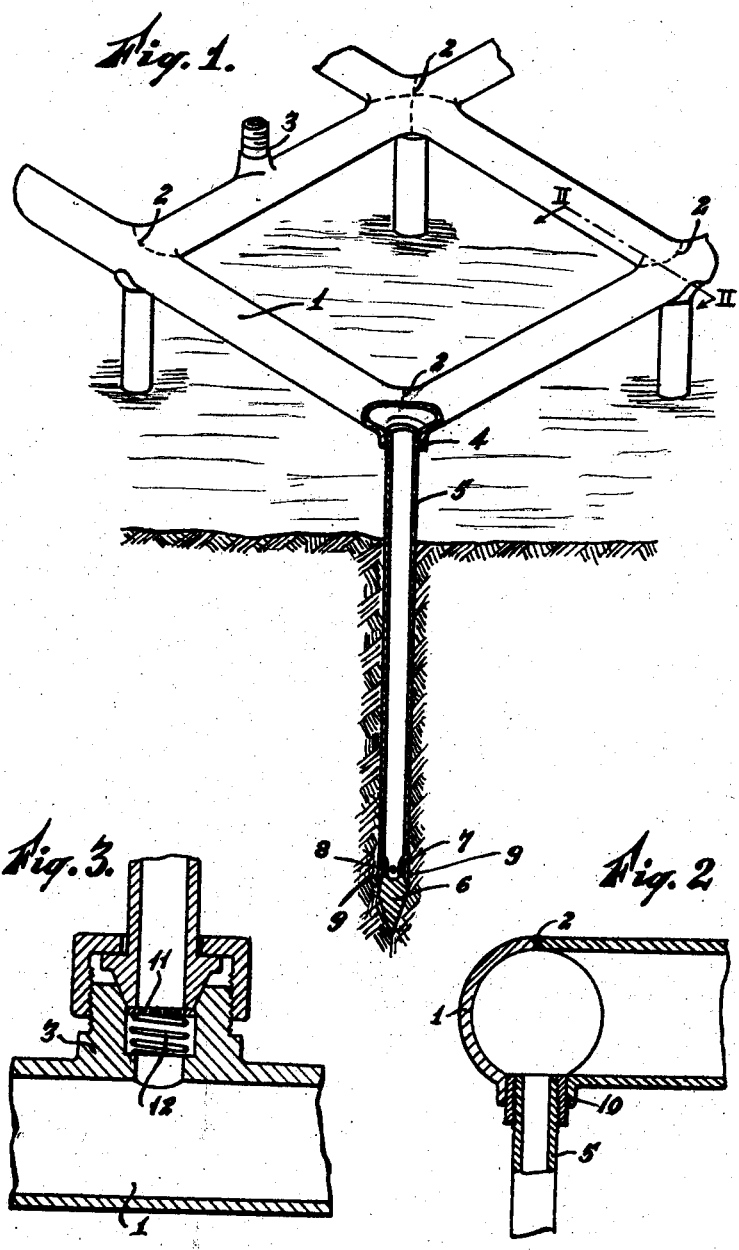

1,895,335

UNITED STATES PATENT OFFICE

FRANK MAXEN, OF BRIMSDOWN, ENGLAND

TINE FOR USE IN SOIL STERILIZING APPARATUS

Application filed April 25, 1929, Serial No. 358,144, and in Great Britain April 26, 1928.

From practical experiments it has appeared that the growth of plants, particularly in glass houses, is greatly promoted by sterilizing the soil periodically by impregnating it with a sterilizing agent, such as e. g. steam.

It has been proposed already to penetrate the ground for this purpose with hollow tines, pointed at their lower ends so as to penetrate the soil easily, and provided with one or more orifices in the wall of the tine, near its pointed end, so as to allow steam or any other sterilizing agent to pass through the tine and impregnate the soil.

Such tines are used in conjunction with a grid, composed of a plurality of short lengths of metal tubing, a number thereof having been arranged end-to-end and connected by screwed jointing devices to form composite tubes, some of said composite tubes having been longitudinally arranged and others transversely arranged to intersect said longitudinal tubes in order to complete the grid. The tines have been arranged one at each junction or point of intersection of composite longitudinal and transverse tubes, and jointing pieces having three, four and five screwed arms have been necessary at said junctions to afford a means of connecting together the meeting tube lengths and tines.

It has been found in practice that the hollow tines become easily choked, since, in the first place, when embedding the tines in the ground the orifices in the tine are filled from the outside with soil, and, in the second place, particles of packing material or cement, used for obtaining a steam-tight connection between the separate lengths of tubes of which the grid is composed, are blown by the steam in the tines and choke the orifices therein from the inside.

By these reasons the efficiency of the apparatus is considerably decreased, and, in some cases, they are causing a complete stoppage of the flow of steam or other sterilizing agent.

The present invention has for its object to remove these objections completely, thus saving much time and trouble in the application of the apparatus and greatly increasing its efficiency.

The invention consists in that the hollow tine, having an inlet opening at the top and being pointed and closed at its lower end, behind its pointed head, is provided with a constricted or narrow apertured neck, in which orifices are arranged, for the outlet of steam or any other sterilizing agent.

This construction may be formed by inwardly pressing or contracting the wall of the tine behind its pointed head—which is of greater width or diameter than the constricted neck—or in any other suitable manner.

The invention further consists in that, at the inlet or supply connection of the tine, a sieve or the like is provided, for preventing any foreign matter, which is carried along by the steam or other sterilizing agent, from entering the tine.

A further feature of the invention is, that the apparatus, provided with tines as described above consists of a grid, composed of tubular elements, which at their joints are welded together to one entirety, thus doing away with packing material for obtaining steam-tight joints and preventing the possibility of the orifices in the tine being choked by particles thereof.

Finally the invention consists in that the grid is provided with connections welded thereto, in which connections the tines are interchangeably arranged.

For a better understanding of the present invention, reference is directed to the accompanying drawing, which illustrates, by way of example, an embodiment of tines and of an apparatus according to the invention.

In the drawing Fig. 1 is a perspective view of a portion of the sterilizing apparatus in which one of the tines is shown in a longitudinal section, whereas other tines are illustrated partly embedded in the soil.

Fig. 2 is a section, substantially on lines II—II in Fig. 1.

Fig. 3 shows in section, the connection between the supply pipe for the steam, or any other sterilizing agent, to the grid.

Referring to the drawing, the grid 1 is composed of tubular elements.

Each of the outer longitudinal and transverse tubular frame elements of the grid, consists of a one-piece tube extending the complete length or width of the grid, as the case may be, said tubes being cut off obliquely at their junction and welded together. The inner set of tubes, that is to say those within the area enclosed by the said outer tubes also are welded to said outer tubes at their junction therewith and are welded together at their points of intersection, so that every joint of the tubes is a welded joint, thus forming one entirety.

To the so constructed grid is provided a steam inlet or supply connection. As appears from Fig. 3 this connection which is welded to the grid, consists of a socket 3 with a compartment in which a compression spring 12 is placed, resting with its lower part on the bottom ring of this compartment. The upper end of this spring bears upon the underside of a perforated gauze or equivalent filter disc 11. A swivel is brought over the said socket, which latter is externally screw-threaded and presses the conical end of the steam supply-pipe on to the socket 3, so that the filter disc is held in place under the compression of the spring; the conical part of the supply-pipe at the same time forms with the conical top part of the compartment of the socket a steam-tight-joint.

When the said swivel is removed and the supply-pipe with the conical part lifted up, the spring urges the filter disc up to above the compartment of the socket, which permits the easy removal of said filter disc and the foreign matter deposited thereon.

On the underneath of the grid, connections 4 are welded on the tubular elements, thus forming one entirety with the grid. The connections 4 are provided with inner screw-thread, in which the hollow tines 5 are screwed.

The tines 5 are pointed at their lower end; above the pointed end 6, the wall of the tine is inwardly pressed or contracted, so that a constricted or narrow apertured neck 7 is formed, in which the orifices 8 are bored.

By placing the grid on the soil to be sterilized and pressing it downwardly, the tines are embedded into the ground; the inlet valve for the steam or other sterilizing agent can now be opened. After the soil is impregnated sufficiently to attain the desired sterilizing effect, the grid is lifted and removed to the next place to be treated.

As appears from Fig. 1, the outlet orifices 8 are always separated by a clearance 9 from the walls of the hole, formed by the pointed head 6 of the tine, so that the possibility of the orifices 8 becoming choked by the soil is excluded.

Fig. 2 shows that instead of connections 4, nipples 10, provided with inner screwthread for the tines 5, may be welded to the grid. By these constructions an interchangeable connection is obtained between the grid and the tines, so that the latter may be easily and quickly interchanged, if required.

In places, which are difficultly accessible, e. g. in corners, near supporting columns, etc., in glass houses, where there is not sufficient room for applying the grid, the tines can be separately connected to a flexible steam supply pipe and then be embedded in the soil to be sterilized, so that no place of the soil in glass houses or the like need be left untreated.

I claim:—

A one piece tine for use in sterilizing soil by impregnation with a sterilizing medium, comprising a one-piece tube of uniform cross section throughout the greater part of its length, said tube being open at its upper end and provided with means to connect it to a gas supply and closed and pointed at its lower end, a constricted neck portion being formed adjacent and behind said pointed end and constantly open outlet orifices in said constricted portion.

In testimony whereof I affix my signature.

FRANK MAXEN.